Jan. 31, 1961  C. N. TAYLOR  2,969,602
TRACTOR LIFT
Filed Aug. 1, 1957  3 Sheets-Sheet 1

Charles N. Taylor
INVENTOR.

Jan. 31, 1961 C. N. TAYLOR 2,969,602
TRACTOR LIFT
Filed Aug. 1, 1957 3 Sheets-Sheet 2

Charles N. Taylor
INVENTOR.

BY *Clarence A. O'Brien*
*and Harvey B. Jacobson*
Attorneys

Jan. 31, 1961   C. N. TAYLOR   2,969,602
TRACTOR LIFT
Filed Aug. 1, 1957   3 Sheets-Sheet 3

Charles N. Taylor
INVENTOR.

United States Patent Office 2,969,602
Patented Jan. 31, 1961

2,969,602
TRACTOR LIFT

Charles N. Taylor, Marsland, Nebr.

Filed Aug. 1, 1957, Ser. No. 675,620

1 Claim. (Cl. 37—144)

This invention relates to an attachment for tractors and more particularly to a multipurpose attachment.

An object of the invention is to provide a lifting attachment for an ordinary tractor, the lifting attachment functioning also as an emergency repair device, a crane, a mold board or scraper blade supporting device and as a general purpose tractor mounted aid to the farmer or other user.

Ordinary loaders and other tractor mounted attachments which support a bucket, mold board or the like, generally have a pair of side arms that are rigidly connected together at or near their forward ends. This is considered to be essential for rigidity of construction. However, it is an object of this invention to provide such an attachment for a tractor where the side arms are mounted independent of each other and are connected together only by the tool, for example, a scraper blade, extending across them. Moreover the connection between the blade and the side arms is such as to permit limited independent movement of the two side arms. The result is that an exceedingly inexpensive and effective way of adjusting the angularity of the supported tool is achieved.

Another object of the invention is to provide a novel manner of mounting the inner ends of the side arms of an attachment. This involves an additional hub attached to the ends of the tractor axles and on which the inner ends of the side arms are mounted for pivotal movement. Therefore, the axis of rotation about which the arms move is coincident with the axis of rotation of the rear wheels of the tractor.

Another object of the invention is to provide a tractor attachment which has a boom that is supported at its lower end on the tractor rear axle housing or a frame or intermediate structure between the axle housing and the end of the boom. This boom functions as a control for the lift arms, extension arms and other parts which may be operatively connected to the lift arms. It is contended that the boom be swung about its pivot axis and the swinging is transmitted to lifting and lowering the side arms of the attachment. Links, cables (preferably the latter) or other structural connecting means are attached to the boom and to the side arms. These are capable of adjustment as to their lengths in order to form an unevenness in the elevation of the side arms, and this unevenness is reflected in angular displacement of the front ends of the arms and anything that is mounted on these front ends, for example, a mold board.

One of the main features of this invention is embodied in a pair of extension arms that are secured to the side arms. These extension arms not only move simultaneously with the side arms but are also controlled by links, rods, cables or the like in a manner similar to the control of the position of the side arms. If a drawbar is attached to the extension arms a great number of odd jobs may be performed. For example, it is even possible to lift one or both of the back wheels of the tractor by building a frame, using a block or some like support beneath the extension arms and power lifting. The rear drawbar between the extension arms could be used for towing tools, implements, disabled motor vehicles or used for any other purpose. At the same time there is the inherent advantage of being capable of being lifted by operation of the boom. The same holds true for the side arms whose front ends may be used in a number of ways.

Other objects and features of importance will become apparent in following the description of the illustrated forms of the invention.

Figure 1:
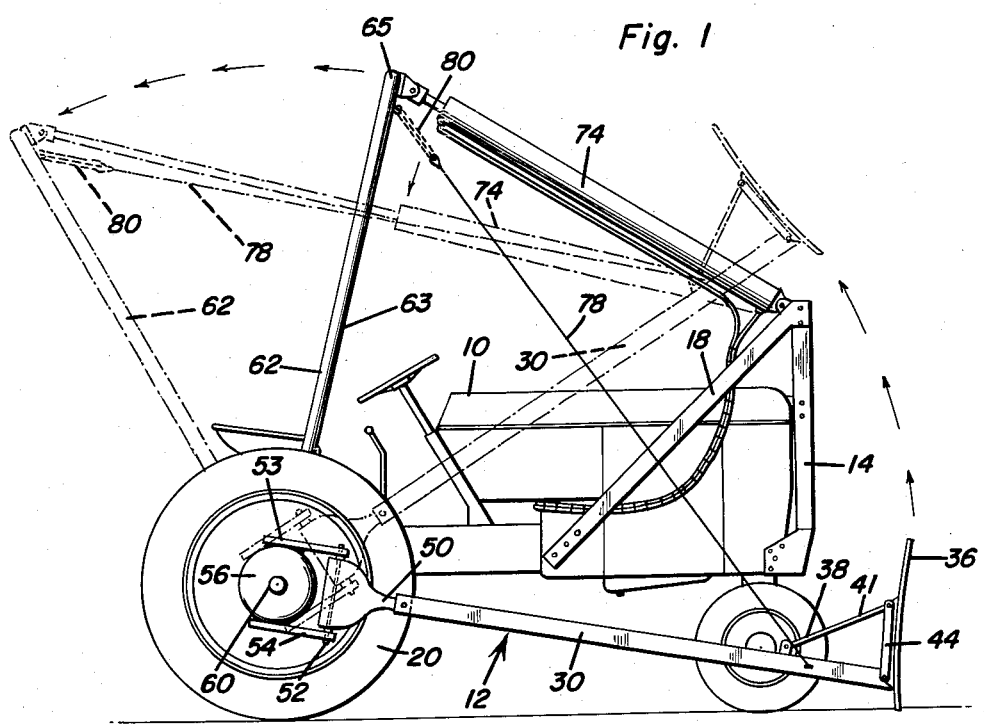
Figure 1 is an elevational side view of an attachment constructed in accordance with the invention.

In the accompanying drawings there is a tractor 10 of ordinary make and this schematically represents any manufacturers' make of tractor on which the attachment 12 may be fitted. The tractor 10 is provided with a forward frame 14 whose upper ends are held secure by braces 16 and 18 which are fixed thereto and which are fixed to the tractor.

The tractor has all of the standard parts necessary such as rear wheels 20 and 22 that are mounted for rotation on axles 24 and 26 disposed in axle housings 27 and 28 of the tractor.

Two side arms 30 and 32 are mounted on the sides of the tractor. The front ends of the side arms are wholly independent of each other and are connected only by the tool extending between them. In the illustrated incident the tool is a moldboard 36. It is held in place by two linkages 38 and 40, respectively, enabling the moldboard to flex slightly. Linkage 38 is identical to linkage 40 and consists in link 41 whose end is pivoted to ear 42 that is welded to the side arm 30 behind its front end. The opposite end of link 41 is connected to link 44, and this is pivoted at two places on the rear surface of moldboard 36. With the extreme outer end of side arm 30 also pivoted to the rear surface of the moldboard and the pivots being formed with some play, the moldboard is capable of flexing at the various pivots.

Side arm 30 is constructed of a sleeve 48 forming its outer part and a rod 50 forming its inner part. They are telescopingly inner fitted and joined together by rivets, bolts or the like. The inner extremity of rod 50 has a pitted pin 52 extending through it and through a pair of mounting brackets 53 and 54 that are parallel to each other and that are welded to a hub 56. The hub 56 is mounted for oscillation on spindle 60, the latter being threaded or otherwise attached to the end of axle 24 and forming an extension of the axle. Accordingly, the side arm 30 is mounted for pivotal movement about an axis which is coincident with the longitudinal axis of shaft 24. The inner end of side arm 32 is connected to an axle extension on axle 26 of the tractor by a mechanism which is identical to that mechanism which was described in connection with side arm 30. Therefore, the side arms are each capable of a limited pivotal movement toward and away from the sides of the tractor as well as rotary movement about the longitudinal axis of the tractor wheel axles.

Figure 2:
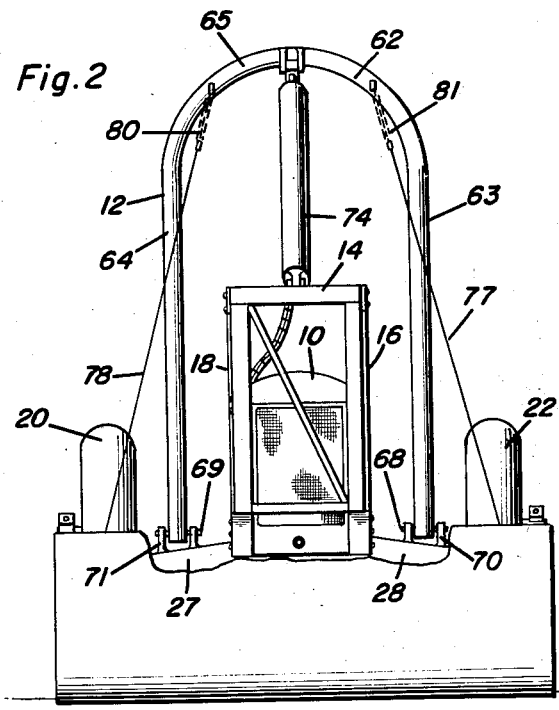
Figure 2 is a front view of the attachment in Figure 1.
Figure 4:
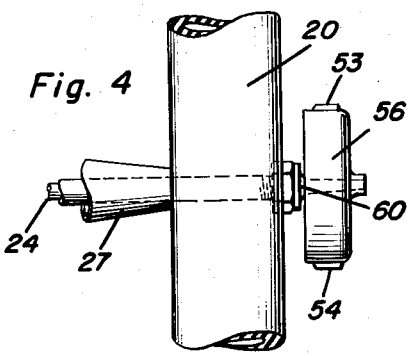
Figure 4 is a fragmentary sectional view showing a wheel axle extension and means for mounting an end of one of the side arms of the attachment thereon.

An inverted U-shaped boom 62 having sides 63 and 64 and an upper cross member 65, is mounted for pivotal movement at its lower ends on approximately horizontal pivot pins 68 and 69. These pivot pins are carried by brackets 70 and 71 (Figure 2) which are welded or otherwise secured to the axle housings 28 and 27, respectively. The boom is of sufficient size to swing over the seated motorist.

A hydraulic motor 74, this hydraulic motor assuming preferably the form of a piston-cylinder assembly, is pivoted at one end to the cross member 65 of boom 62 and pivoted at its other end to the frame 14 at the front of the tractor. Means of a mechanical nature connect the boom with the side arms of the tractor attachment. These means may be links, rods and like rigid connectors but are preferably cables 77 and 78 whose lower ends are secured to the side arms and whose upper ends are secured to the boom at intermediate agency of short lengths 80, 81 of chain. The chain is supplied so that it may be more easily unhooked and shortened by attaching a different link in the hooks that are on the boom. This provides dissimilar links in the cables for adjusting one of the side arms at a different elevation from the other side arm. The cylinder assembly may be either single acting or double acting.

Figure 7:
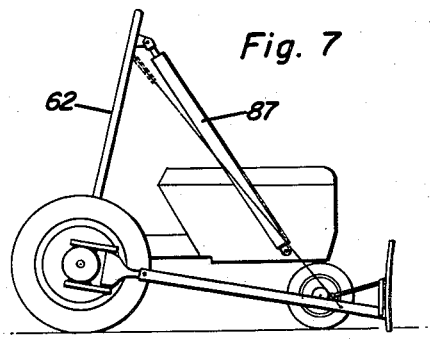
Figure 7 is a schematic elevational view of a modification of the invention.
Figure 8:
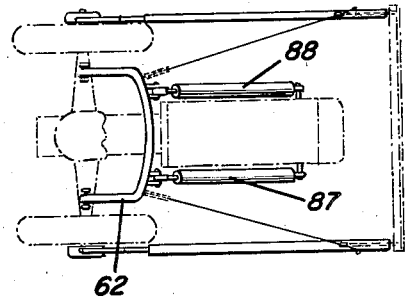
Figure 8 is a top view of the tractor and attachment of Figure 7.
Figure 9:
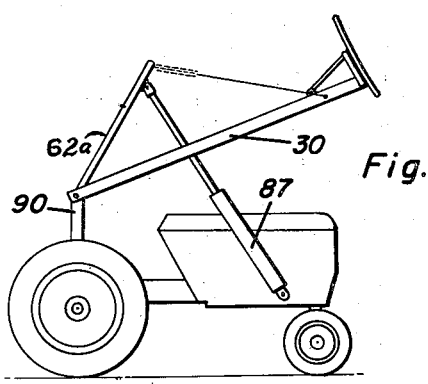
Figure 9 is an elevational view of another modification of the invention, this view also being a schematic representation.
Figures 5, 6:
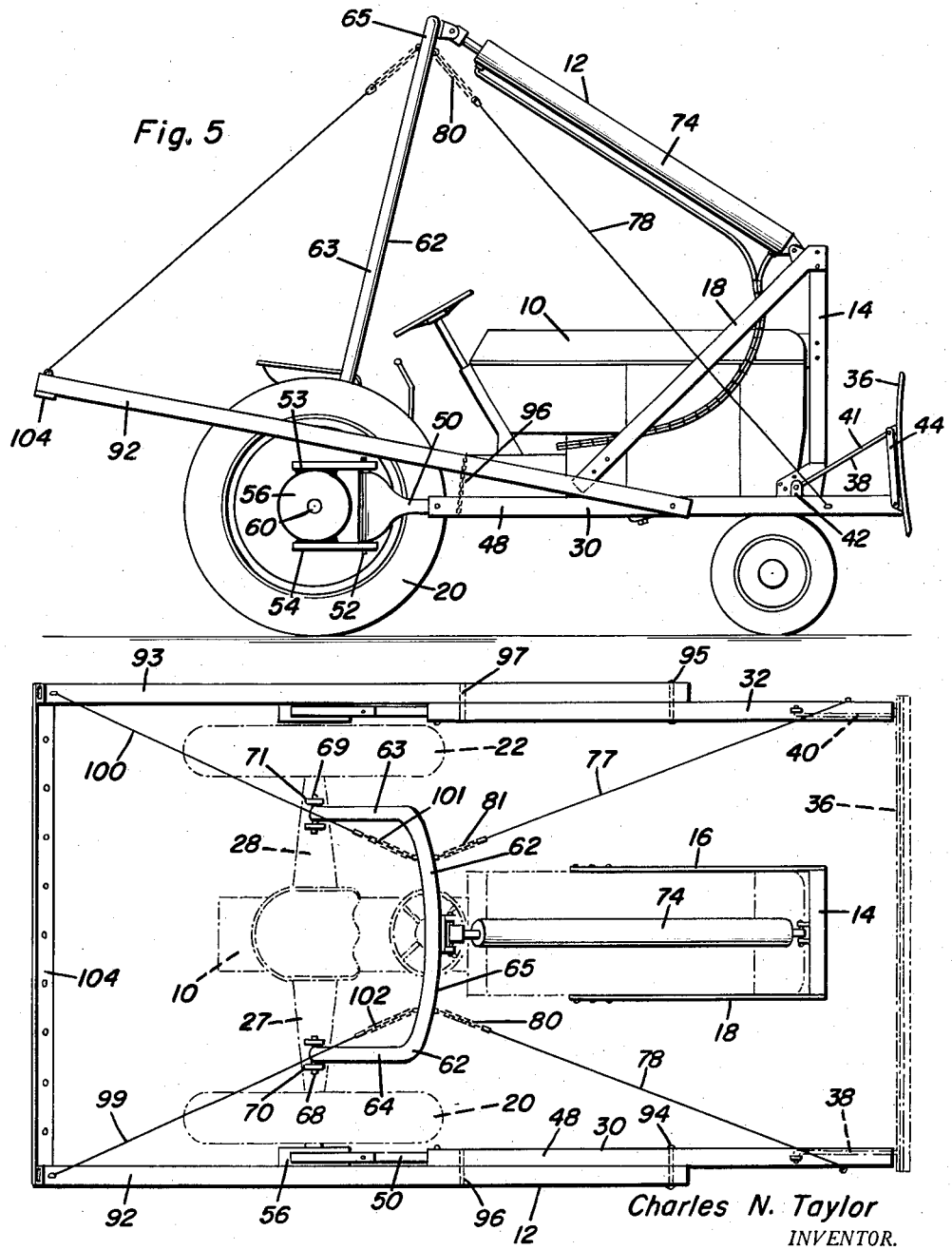
Figure 5 is an attachment on a tractor the same as the attachment of Figure 1, but the extension arms which are optionally used with the attachment, are mounted in place.
Figure 6 is a top view of the attachment and tractor of Figure 5.

The embodiment of Figures 7 and 8 differs from that which has been described by showing that the invention contemplates the use of more than one fluid motor. The piston-cylinder assemblies 87 and 88 are pivoted to the boom and to the sides of the tractor. Many tractors are provided with forward drawbars to which the fluid motors may be easily directly secured. Otherwise, brackets may be attached to provide the support for the fluid motors. The embodiment of Figure 9 shows that boom 62a may be mounted higher and at a position on the tractor different from the other figures in the drawings. The frame 90 is intended to show that the invention is applicable to a conventional high lift machine or practically any kind of machine.

Figure 3:
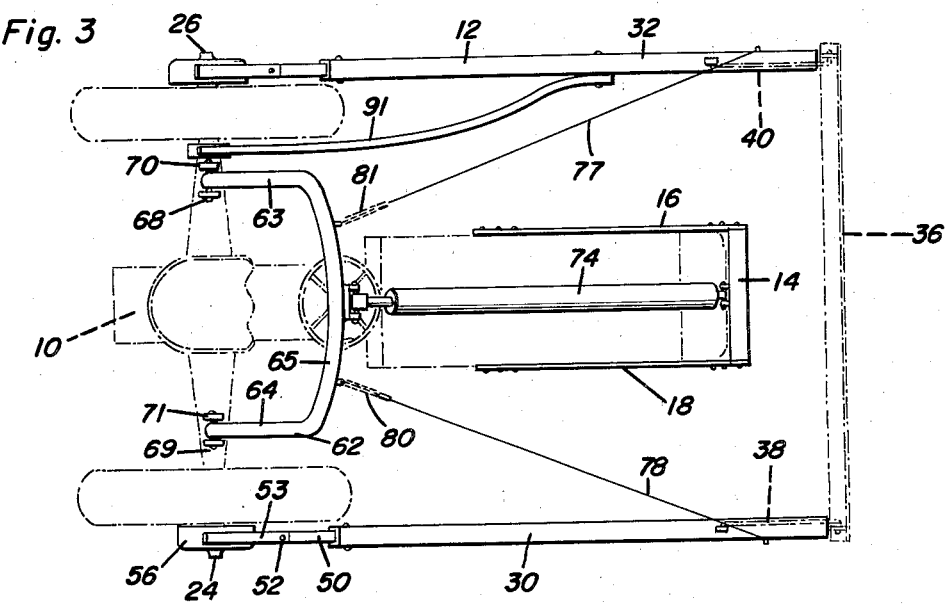
Figure 3 is a top view of the attachment in Figure 1, the tractor being shown in dotted lines.

Many other structural departures may be made. There are many options that may be adopted. Reference to Figure 3 shows that there is a brace 91 having an eye at its inner end and mounted for rotation in a bearing or on a bearing carried by one of the axle housings of the tractor. The opposite end of the brace is pivotally attached to the side arm 32 and this lends support to a side arm. Forward braces, where found desirable, may be used in a manner as suggested by the brace 91.

There are two extension arms 92 and 93 that are attached to the side arms 30 and 32 respectively. The extension arms protrude rearwardly of the tractor and are coupled with the side arms by pivot pins 94 and 95. Chains 96 and 97 secured to and extending between the extension arms 92 and 93 and the adjacent side arms 30 and 32 limit the extent of pivotal movement of the extension arms with respect to the side arms. The cables 99 and 100 are secured to the rear ends of the extension arms 92 and 93. They have lengths 101 and 102 of chain attached to their inner ends and also attached to the boom 62. The purpose of the cables 99 and 100 and their chains 101 and 102 are identical to the purpose and functioning of the previously described chains and cables. However, the cables 99 and 100 simultaneously lift and lower the extension arms with the side arms 30 and 32 of the tractor attachment. A drawbar 104 of any other tool, implement, baggage or item that is to be towed, and/or lifted, may be attached to the ends of the extension arms.

Although many purposes of the invention have been described, it is understood that many more purposes, far too numerous to list may be served by the invention. Accordingly, since many modifications, uses, purposes, alterations in structure, etc. may be made without departing from the invention, limitation is sought only in accordance with the scope of the following claim.

As described in the invention, what is claimed as new is as follows:

In a tractor which has a tractor body, a rear axle housing establishing a pivot axis, and rear wheels, a seat near said rear axle, and a pair of front wheels, a multipurpose attachment comprising a forward frame, means attaching the forward frame to the front part of the tractor, said forward frame having a portion which raises above said front part of the tractor, at least one hydraulic cylinder pivoted to said portion of said frame that rises above the front part of the tractor, a substantially U shaped inverted boom having lower ends, means for pivoting said lower ends of said substantially U-shaped boom adjacent and in spaced relation to the rear axle housing for movement about an axis spaced from and parallel to said pivot axis with said boom swingable above the tractor and the sides of said boom travelling on opposite sides of the tractor, means pivotally connecting said hydraulic cylinder to an intermediate part of said boom above the tractor, side arms pivoted to the rear of said tractor for movement about said pivot axis and located on the sides of the tractor, means for attaching an implement to the front part of said side arms and located in advance of the front wheels of the tractor, and mechanical connecting means attached to an intermediate part of said boom and said side arms near the front ends thereof for mechanically coupling said side arms to said boom so that said side arms are pivotally movable in response to pivotal movement of said boom.

References Cited in the file of this patent

UNITED STATES PATENTS

| | | |
|---|---|---|
| 2,137,829 | Austin | Nov. 22, 1938 |
| 2,268,689 | Andrus | Jan. 6, 1942 |
| 2,432,645 | Ausfahl et al. | Dec. 16, 1947 |
| 2,469,007 | Siebring | May 3, 1949 |
| 2,488,695 | Upton | Nov. 22, 1949 |
| 2,520,451 | Baker | Aug. 29, 1950 |
| 2,530,656 | Fall | Nov. 21, 1950 |
| 2,610,752 | Luebbers | Sept. 16, 1952 |
| 2,675,933 | Baker | Apr. 20, 1954 |
| 2,677,203 | Poirier | May 4, 1954 |
| 2,737,735 | Westfall | Mar. 13, 1956 |

FOREIGN PATENTS

| | | |
|---|---|---|
| 132,693 | Australia | May 23, 1949 |